United States Patent
Decrop et al.

(10) Patent No.: US 11,632,473 B2
(45) Date of Patent: Apr. 18, 2023

(54) DYNAMIC NOTIFICATION TONE MODIFICATION

(71) Applicant: International Business Machines Corporation, Armonk, NY (US)

(72) Inventors: Clement Decrop, Arlington, VA (US); Spencer Thomas Reynolds, Austin, TX (US); Jeremy R. Fox, Georgetown, TX (US); Zachary A. Silverstein, Austin, TX (US); Jacob Ryan Jepperson, St. Paul, MN (US)

(73) Assignee: International Business Machines Corporation, Armonk, NY (US)

( * ) Notice: Subject to any disclaimer, the term of this patent is extended or adjusted under 35 U.S.C. 154(b) by 11 days.

(21) Appl. No.: 17/341,558

(22) Filed: Jun. 8, 2021

(65) Prior Publication Data
US 2022/0394135 A1   Dec. 8, 2022

(51) Int. Cl.
  *H04M 19/04* (2006.01)
  *H04L 12/18* (2006.01)
  *H04M 3/42* (2006.01)

(52) U.S. Cl.
  CPC ...... *H04M 19/041* (2013.01); *H04L 12/1822* (2013.01); *H04L 12/1827* (2013.01); *H04M 3/42017* (2013.01)

(58) Field of Classification Search
  None
  See application file for complete search history.

(56) References Cited

U.S. PATENT DOCUMENTS

| 8,957,847 | B1 | 2/2015 | Karakotsios |
| 8,994,781 | B2* | 3/2015 | Anderson ............. H04N 7/15 348/14.08 |
| 9,167,069 | B2* | 10/2015 | Mullen .............. H04M 1/724 |
| 9,407,448 | B2 | 8/2016 | Grevers, Jr. |

(Continued)

FOREIGN PATENT DOCUMENTS

| EP | 3435641 B1 | 4/2020 |
| WO | 2018212921 A1 | 11/2018 |

OTHER PUBLICATIONS

"Background noise suppression", Zoom, downloaded from the internet on Feb. 8, 2021, 2 pages, <https://support.zoom.us/hc/en-us/articles/360046244692-Background-noise-suppression>.

(Continued)

*Primary Examiner* — Hemant S Patel
(74) *Attorney, Agent, or Firm* — Erika R. DeCosty

(57) ABSTRACT

A computer-implemented method for real-time modification of notification tones to distinguish an intended recipient of a notification tone is disclosed. The computer-implemented method includes monitoring an audio stream of an online conference for one or more audio notification tones. The computer-implemented method further includes detecting that a notification tone generated outside of the online conference matches the notification tone of an application or user device associated with two or more participants of the online conference. The computer-implemented method further includes responsive to detecting that the notification tone matches the notification tone of an application or user device associated with two or more participants of the online conference, generating an ameliorative action associated with the notification tone.

20 Claims, 5 Drawing Sheets

(56) References Cited

U.S. PATENT DOCUMENTS

| | | |
|---|---|---|
| 9,451,582 B2 | 9/2016 | Travis |
| 10,553,239 B2 | 2/2020 | Reynolds |
| 2003/0185369 A1* | 10/2003 | Oliver ............... H04M 3/56 |
| | | 379/202.01 |
| 2013/0329866 A1* | 12/2013 | Mai .................. H04M 3/563 |
| | | 379/88.01 |
| 2014/0029733 A1* | 1/2014 | Smith ............... H04M 3/493 |
| | | 379/88.01 |
| 2016/0036967 A1 | 2/2016 | Agrawal |
| 2019/0320074 A1 | 10/2019 | Zhang |

OTHER PUBLICATIONS

"Video Conferencing Market Worth $6.7 Billion by 2025 | CAGR: 9.2%: Grand View Research, Inc.", PR Newswire, San Francisco, Aug. 1, 2019, 3 pages.

"World's Best Innovative Noise Cancellation Technology Powered by Deep Neural Network", Krisp, downloaded from the internet on Feb. 8, 2021, 4 pages.

Mell et al., "The NIST Definition of Cloud Computing", Recommendations of the National Institute of Standards and Technology, NIST Special Publication 800-145, Sep. 2011, 7 pages.

\* cited by examiner

DYNAMIC NOTIFICATION TONE MODIFICATION

BACKGROUND

The present invention relates generally to the field of audio notifications, and more particularly to reducing confusion and disruption caused by commonly used audio notification tones.

Audio notifications indicate to a user that they received a notification on one of their various user devices. Many user devices or applications include default or pre-saved audio tones. Users can either opt into the default tones, select a pre-saved tone, or in some cases create their own custom audio tone. Different notification tones can signal to a user what platform, application, or device the notification tone came from.

SUMMARY

According to one embodiment of the present invention, a computer-implemented method for real-time modification of notification tones to distinguish an intended recipient of a notification tone is disclosed. The computer-implemented method includes monitoring an audio stream of an online conference for one or more audio notification tones. The computer-implemented method further includes detecting that a notification tone generated outside of the online conference matches the notification tone of an application or user device associated with two or more participants of the online conference. The computer-implemented method further includes responsive to detecting that the notification tone matches the notification tone of an application or user device associated with two or more participants of the online conference, generating an ameliorative action associated with the notification tone.

According to another embodiment of the present invention, a computer program product for real-time modification of notification tones to distinguish an intended recipient of a notification tone is disclosed. The computer program product includes one or more computer readable storage media and program instructions stored on the one or more computer readable storage media. The program instructions include instructions to monitor an audio stream of an online conference for one or more audio notification tones. The program instructions further include instructions to detect that a notification tone generated outside of the online conference matches the notification tone of an application or user device associated with two or more participants of the online conference. The program instructions further include instructions to responsive to detecting that the notification tone matches the notification tone of an application or user device associated with two or more participants of the online conference, generate an ameliorative action associated with the notification tone.

According to another embodiment of the present invention, a computer system for real-time modification of notification tones to distinguish an intended recipient of a notification tone is disclosed. The computer system includes one or more computer processors, one or more computer readable storage media, and computer program instructions, the computer program instructions being stored on the one or more computer readable storage media for execution by the one or more computer processors. The program instructions include instructions to monitor an audio stream of an online conference for one or more audio notification tones. The program instructions further include instructions to detect that a notification tone generated outside of the online conference matches the notification tone of an application or user device associated with two or more participants of the online conference. The program instructions further include instructions to responsive to detecting that the notification tone matches the notification tone of an application or user device associated with two or more participants of the online conference, generate an ameliorative action associated with the notification tone.

BRIEF DESCRIPTION OF DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
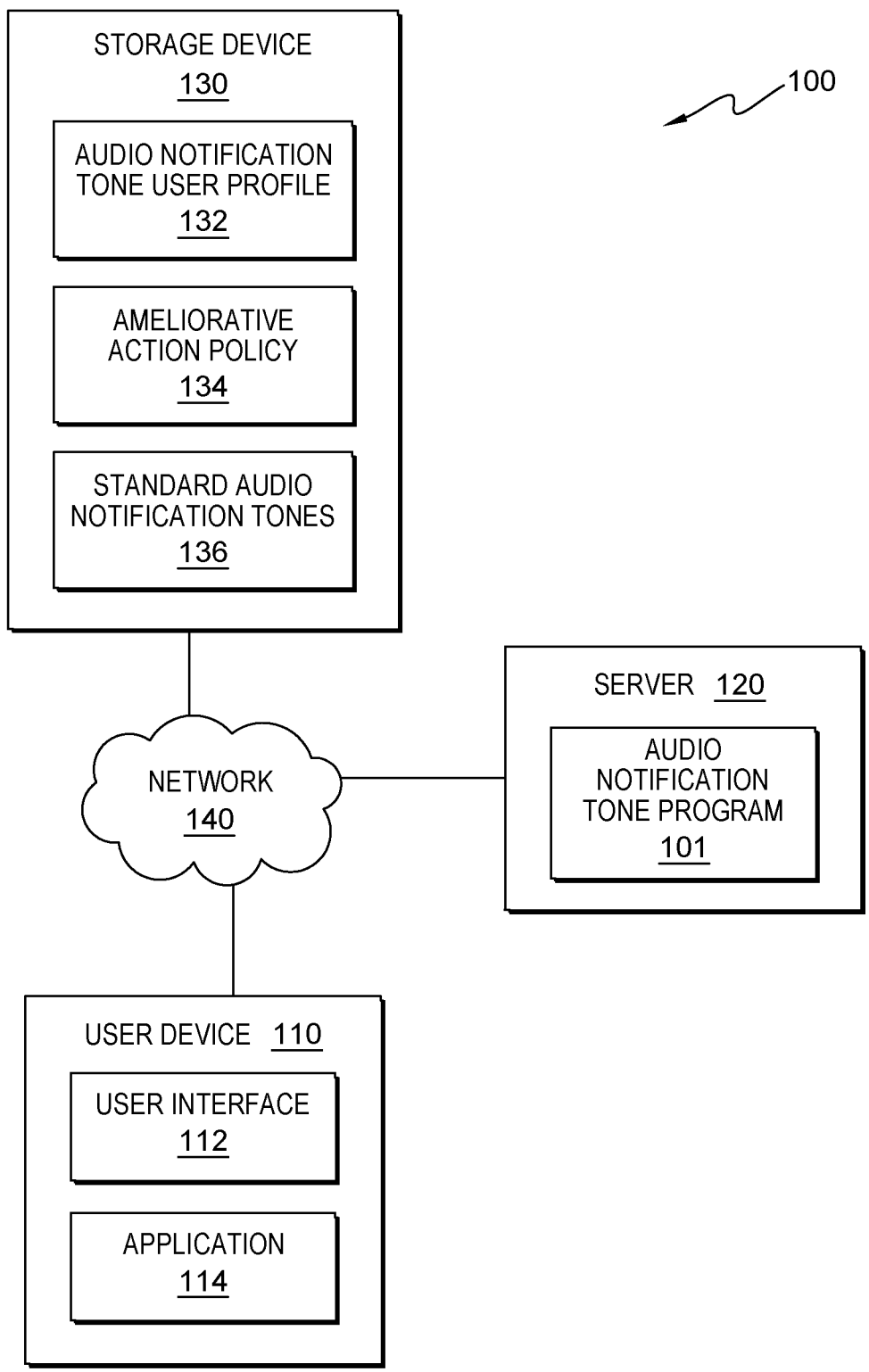
FIG. 1 is a block diagram of a network computing environment for generating ameliorative actions for audio notification tones transmitted over an online conferencing, generally designated 100, in accordance with at least one embodiment of the present invention.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The present invention relates generally to the field of audio notifications, and more particularly to reducing confusion and disruption caused by commonly used audio notification tones.

The number of people using teleconference and video conference tools continues to increase for work, social activities and catching up with family. Teleconference and video conference tools are often used on phones, tablets, and computers that are running a variety of other applications such as messaging applications, social media applications, and email applications. Users may also have other devices nearby the particular device that is being used for an audio and or video call. When messages or notifications activate an audio notification tone either on the same device being utilized for an audio or video call or a different device then the device being utilized for the call, the audible notification tone is played back to everyone on the audio or video conference. With the prevalence of default tones, this can cause confusion as to which particular user actually received a notification and likely will result in multiple people checking various applications and/or devices to see if they are the recipient of the notification. Embodiments of the present invention recognize that this confusion caused by common audio notifications can interrupt and distract a user, the meeting, speaker and/or presentation.

For example, if a commonly used audio notification tone is played over a teleconference or video conference, those participants that use this audio notification tone may check their device for a notification when the audio notification tone was actually received by a different individual. This can be both disruptive and distracting to many other users. Oftentimes, applications and user devices are preprogrammed with default notification tones which many users keep. The use of the default or pre-saved notification tones increase the chance of confusion as to which device the default notification came from when the default notification tone is transmitted over a teleconference or video conference application. Accordingly, embodiments of the present invention recognize the need to reduce confusion and disruption caused by commonly used notification tones transmitted over a teleconference or video conference application.

Embodiments of the present invention reduce the confusion and disruption caused by notification tones played over a teleconference or video conference that are used by applications of device of multiple participants of the teleconference or video conference. In an embodiment, the present invention documents notification tones for various devices and applications used by the user. In an embodiment, the present invention determines notification tones for a user's devices and applications. In an embodiment the present invention monitors incoming and outgoing audio during a teleconference or video conference to detect audio notification tones typically used by multiple individuals on the call. When tones that match two or more participants of the call, the present invention takes ameliorative action in order to reduce or eliminate any confusion as to the intended recipient of the notification.

The present invention may be a system, a method, and/or a computer program product at any possible technical detail level of integration. The computer program product may include a computer readable storage medium (or media) having computer readable program instructions thereon for causing a processor to carry out aspects of the present.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suit-able combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention will now be described in detail with reference to the Figures. FIG. 1 is a functional block diagram of a network computing environment for generating ameliorative actions for audio notification tones transmitted over a web conference, generally designated 100, in accordance with at least one embodiment of the present invention. In an embodiment, network computing environment 100 may be provided by cloud computing environment 50, as depicted and described with reference to FIG. 4, in accordance with at least one embodiment of the present invention. FIG. 1 provides an illustration of only one implementation and does not imply any limitations with regard to the environments in which different embodiments may be implemented. Many modifications to the depicted environment may be made by those skilled in the art without departing from the scope of the present invention as recited by the claims.

Network computing environment 100 includes user device 110, server 120, and storage device 130 interconnected over network 140. User device 110 may represent a computing device of a user, such as a laptop computer, a tablet computer, a netbook computer, a personal computer, a desktop computer, a personal digital assistant (PDA), a smart phone, a wearable device (e.g., smart glasses, smart watches, e-textiles, AR headsets, etc.), or any programmable computer systems known in the art. In general, user device 110 can represent any programmable electronic device or combination of programmable electronic devices capable of executing machine readable program instructions and communicating with server 120, storage device 130 and other devices (not depicted) via a network, such as network 140. User device 110 can include internal and external hardware components, as depicted and described in further detail with respect to FIG. 3.

User device 110 further includes user interface 112 and application 114. User interface 112 is a program that provides an interface between a user of an end user device, such as user device 110, and a plurality of applications that reside on the device (e.g., application 114). A user interface, such as user interface 112, refers to the information (such as graphic, text, and sound) that a program presents to a user, and the control sequences the user employs to control the program. A variety of types of user interfaces exist. In one embodiment, user interface 112 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 112 is a script or application programming interface (API).

Application 114 can be representative of one or more applications (e.g., an application suite) that operate on user device 110. In an embodiment, application 114 is representative of one or more applications (e.g., social media applications, web conferencing applications, and email applications) located on user device 110. In various example embodiments, application 114 can be an application that a user of user device 110 utilizes to participate in an online conference, such as a teleconference or video conference. In an embodiment, application 114 can be a client-side application associated with a server-side application running on server 120 (e.g., a client-side application associated with audio notification tone program 101). In an embodiment, application 114 can operate to perform processing steps of audio notification tone program 101 (i.e., application 114 can be representative of audio notification tone program 101 operating on user device 110).

Server 120 is configured to provide resources to various computing devices, such as user device 110. In various embodiments, server 120 is a computing device that can be a standalone device, a management server, a web server, an application server, a mobile device, or any other electronic device or computing system capable of receiving, sending, and processing data. In an embodiment, server 120 represents a server computing system utilizing multiple computers as a server system, such as in a cloud computing environment. In an embodiment, server 120 represents a computing system utilizing clustered computers and components (e.g. database server computer, application server computer, web server computer, webmail server computer, media server computer, etc.) that act as a single pool of seamless resources when accessed within network computing environment 100. In general, server 120 represents any programmable electronic device or combination of programmable electronic devices capable of executing machine readable program instructions and communicating with each other, as well as with user device 110, storage device 130, and other computing devices (not shown) within network computing environment 100 via a network, such as network 140.

Figure 3:
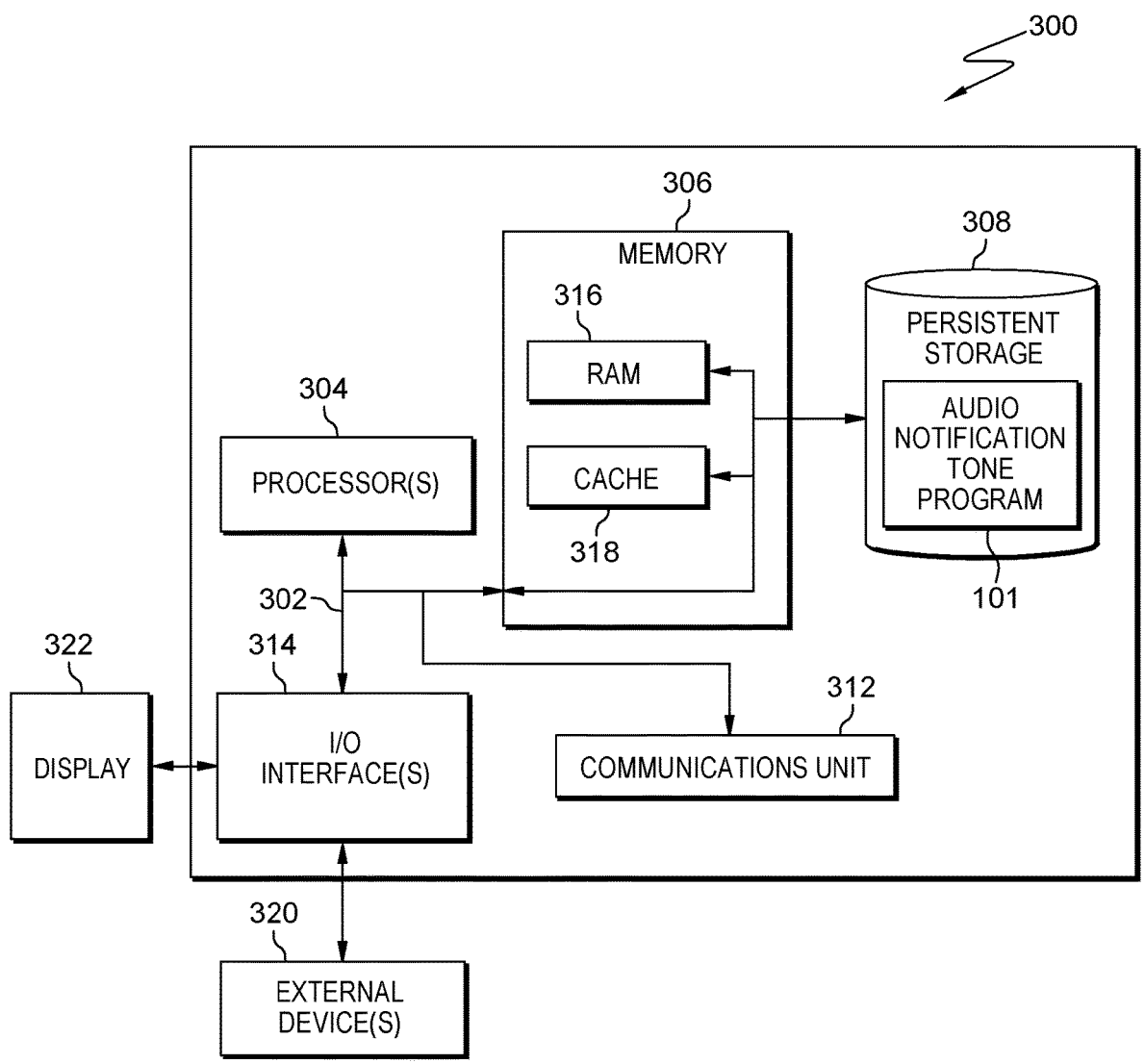
FIG. 3 is a block diagram depicting components of a computer, generally designated 300, suitable for executing audio notification tone program 101 in accordance with at least one embodiment of the present invention.
Figure 4:
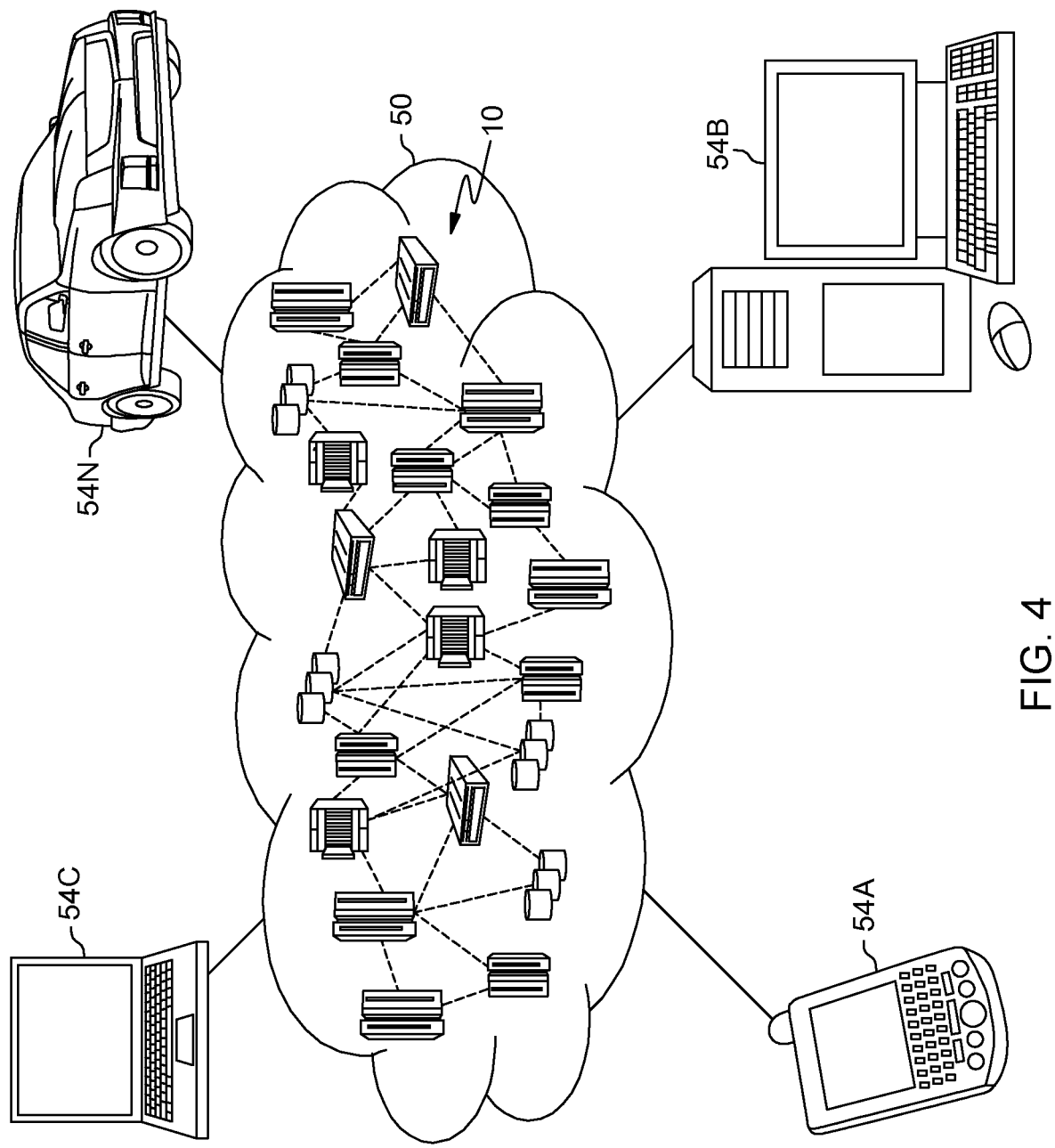
FIG. 4 is a block diagram depicting a cloud computing environment 50 in accordance with at least one embodiment of the present invention.

Server 120 may include components as depicted and described in detail with respect to cloud computing node 10, as described in reference to FIG. 4, in accordance with at least one embodiment of the present invention. Server 120 may include components, as depicted and described in detail with respect to computing device 300 of FIG. 3, in accordance with at least one embodiment of the present invention.

In various embodiments, storage device 130 is a secure data repository for persistently storing audio notification tones utilized by various applications and user devices of a user, such as user device 110. Storage device 130 may be implemented using any volatile or non-volatile storage media known in the art for storing data. For example, storage device 130 may be implemented with a tape library, optical library, one or more independent hard disk drives, multiple hard disk drives in a redundant array of independent disks (RAID), solid-state drives (SSD), random-access memory (RAM), and any possible combination thereof. Similarly, storage device 130 may be implemented with any suitable storage architecture known in the art, such as a relational database, an object-oriented database, or one or more tables.

Storage device 130 includes audio notification tone user profile 132, ameliorative action policy 134, and standard audio notification tones 136. Audio notification tone user profile 132 includes information associated with the particular notification tones generated by computing devices and applications utilized by a particular user. In an embodiment, audio notification tone user profile 132 includes information of known audio tones by user device or user. Known audio notification tones can include audio notification tones audio notification tone program 101 has previously heard or detected. In an embodiment, audio notification tone user profile 132 includes information about learned audio tones generated by a particular application or device used by a particular user. In an embodiment, audio notification tone program 101 generates audio notification tone user profiles for a plurality of users, in which each respective audio notification tone user profile includes the particular notification tones generated by applications and devices associated with each user.

Typically, one or more devices are in close proximity to one another and can pick up the audio notification tone from each other. In addition, the same audio notification tone from a computer may sound different than the same audio notification tone from a cell phone. In some instances, the same audio notification tone may sound different based on the distance between the device being used for an online conference and the device which played the audio notification tone. In an embodiment, audio notification tone program 101 learns the particular tones frequently generated by applications and devices associated with a particular user. For example, users may select different audio tones for the same application that resides on different devices. For example, the notification tone for a user's work email may be different than the notification tone for their personal email. In another example, a user may select audio notification tone A for their work email on their work laptop but audio notification tone B for their work email on their personal cell phone. In an embodiment, audio notification tone program 101 learns the particular tones generated by applications and devices associated with a particular user based on the day of the week, time of day, location of the user, or activity of the user.

In an embodiment, audio notification tone user profile 132 includes information of known audio tones by user. In some instances, other users and their user devices are in close proximity to the user device utilized to participate in an online conference. For example, different users may have different audio notification tones. In an embodiment, audio notification tone user profile 132 includes audio notification tone information associated with other individuals in which a particular user frequently conducts online conferences with. Embodiments of the present invention recognize that many users within conference meetings will be repeat users that have participated in previous online conferences with each other before. For example, users will conduct a teleconference or video conference with repeat users, such as their coworkers, friends, or family This allows audio notification tone program 101 to build out an audio notification tone user profile 132 for each user and map, match, and generate ameliorative actions based on the suggested set of users that are joining or predicted to join the online conference.

In an embodiment, audio notification tone user profile 132 includes unique profiles of users and their sound device profiles based on their activities and devices per a specific physical location. For example, a user may have a different type of notification set up when at home versus at their work office. In an embodiment, audio notification tone user profile 132 contains information on the Fourier Series wavefront of the audio notification tone. A wavefront can be represented as a form of Fourier Series to identify tones that are similar in nature. A Fourier Series is a periodic function composed of harmonically related sinusoids, combined by a weighted summation.

Ameliorative action policy 134 includes a dynamic set of rules for using, selecting, and performing ameliorative actions in response to detecting an audio notification tone during an online conference. In an embodiment, ameliorative action policy 134 includes information describing different ameliorative actions that audio notification tone program 101 should generate depending on the circumstances. For example, ameliorative action policy 134 includes rules as to whether an incoming and/or outgoing audio notification tone should be blocked, removed, modified, or scrubbed. For example, ameliorative action policy 134 may include a different set of rules for how and when to remove, modify, scrub, or block an audio notification tone based on the volume of the audio notification tone detected. In an embodiment, ameliorative action policy 134 may include a set of rules to remove an audio notification tone if it is above a predetermined volume. For example, a detected audio notification tone may be removed if it is above a predetermined volume. In another example, ameliorative action policy 134 may include one or more sets of rules if the audio notification tone is received on the user device utilized to participate in a teleconference or video conference and another set of rules if the audio notification is received on a different user device than the one utilized to participate in a teleconference or video conference. In an embodiment, ameliorative action policy 134 includes information directed towards when audio notification tone program 101 should notify one or more users participating in an online conference that an audio notification tone was not intended for them by a pop-up notification box.

In many instances, many applications have default notification tones that are unique to a particular application. In an embodiment, standard audio notification tones 136 is a global cloud-based corpus of standard audio notification tones that includes frequently used or default audio notification tones for common applications and devices. In an embodiment, standard audio notification tones 136 are determined by accessing the settings of a user device or application. In an embodiment, standard audio notification tones 136 are saved to storage device 130. In an embodiment, standard audio notification tones 136 include corresponding wave forms based on standard tones that come with or are pre-loaded on a device. Meaning, these audio notification tones are not learned or determined by audio notification tone program 101, unlike the audio notification tones saved in audio notification tone user profile 132. In an embodiment, standard audio notification tones 136 include one or more user selected notification tones. For example, a user can select a notification tone from a list of preprogrammed notification tones for a particular application.

Server 120 further includes audio notification tone program 101. In an embodiment, audio notification tone program 101 learns notification tones generated by one or more user devices and applications over time. In an embodiment, audio notification tone program 101 monitors incoming and outgoing audio during an online conference for similar tones typically generated by devices or applications of two or more participants of the online conference. If a similar matching audio notification tone is detected, audio notification tone program 101 takes ameliorative actions to eliminate any confusion as to the actual recipient of the audio tone notification.

In an embodiment, audio notification tone program 101 requests the user to opt into the use of audio notification tone program 101. Accordingly, a user may grant audio notification program 101 permission to monitor outgoing and incoming audio for audio notification tones while using online conference software. In an embodiment, audio notification tone program 101 generates a database of known audio notification tones for the user. In an embodiment, audio notification tone program 101 scans the settings of local and connected devices to determine which audio notification tones the user has configured for a variety of applications. In an embodiment, audio codex captures audio streams at either the client level or the server level. In an embodiment, audio notification tone program 101 transforms the audio flowing through the audio codex and transforms the audio into a comparable wave format to capture similarity values between the audio transmitted during an online conference and audio notification tones stored in respective audio notification tone user profiles 132.

In an embodiment, audio notification tone program 101 correlates audible tones over time with system and device notifications both of the primary device (i.e., the device connected to an online conference) and other nearby devices. In an embodiment, audio notification tone program 101 transforms audio transmitted over an online conference into waveforms represented as a form of Fourrier Series in order to identify tones that are similar in natures. For example, audio notification transforms audio into waveforms via the following equation:

$$f(t) = a_0 + \sum_{m=1}^{\infty} a_m \cos\left(\frac{2\pi mt}{T}\right) + \sum_{n=1}^{\infty} b_n \sin\left(\frac{2\pi mt}{T}\right)$$

In an embodiment, audio notification tone program 101 generates unique profiles for a user and their sound device profile based on their activities, devices, and physical location. For example, a user may have a different audio notification tone for when they are in the office compared to when they are home.

In an embodiment, audio notification tone program 101 determines if the user is participating in an online conference, such as a teleconference or video conference. In an embodiment, audio notification tone program 101 scans the incoming and outgoing audio to determine if an audio notification tone is detected. In an embodiment, audio notification tone program 101 transforms the audio into a comparable wave format to best capture similarity values of the audio. In an embodiment, a similar notification tone is detected based on comparing audio notification tone user profile 132 or standard audio notification tones 136 with incoming or outgoing notification tones detected during an online conference.

In an embodiment, audio notification program 101 monitors incoming or outgoing audio during a teleconference or video conference for notification tones that match notification tones associated with audio notification tone user profile 132. In an embodiment, if a match is detected between a notification tone utilized by two or participants of the online conference, audio notification tone program 101 takes action to scrub or modify the audio in a way that it won't be mistaken by someone in which the notification was not actually intended for. In an embodiment, where the user's device or connected device detects an audio notification tone, audio notification tone program 101 recognizes the tone and takes ameliorative action to modify or scrub the outgoing signal so other participants on the video call will not think they have received the notification. In an embodiment, audio notification tone program 101 modifies the matching audio notification tone to sound differently than the audio notification tones used by one or more users in the teleconference or video conference. In an embodiment, audio notification tone program 101 does not transmit the audio notification tone to the intended user. For example, if user A and B are on a video conference on their laptops and user A's phone plays an audio notification tone, the audio notification tone is not played back to user A since user A is the intended user of the audio notification. In an embodiment, notification tone program alters the user that an audio tone notification was not meant for the user via a pop-up window.

There are a variety of different ameliorative action audio notification tone program 101 can take in response to detecting an audio notification tone. In an embodiment, if audio notification tone program 101 is unable to remove the detected matching audio notification tone, audio notification tone program 101 can modify the matching audio notification tone to sound differently than the audio notification tones used by one or more users in the teleconference or video conference. In an embodiment, if audio notification tone program 101 is unable to remove or alter the detected matching audio notification tone, audio notification tone program 101 may alert a user that an audio notification tone transmitted over an online conference via a graphical user interface (GUI) pop-up window.

The following examples illustrate various implementations of audio notification tone program 101.

In an embodiment, audio notification tone program 101 determines if the user is currently speaking or participating in the teleconference or video conference. In an embodiment where the user is not actively speaking, audio notification tone program 101 can briefly mute the user's audio of which a matching notification tone is detected. For example, if users A, B, and C are in a video conference call and user A received an audio notification tone which matched the saved audio notification tones of user B, audio notification tone program 101 will briefly mute user A if it is determined user A is not actively speaking. In this example, user A and the matching audio notification tone would be muted across all participating user devices. In another embodiment, when a matching audio notification tone is detected, audio notification tone program 101 plays an alternative sound to mask or modify the matching audio notification tone to decrease confusion between the other users. For example, if audio notification tone program 101 detects an outbound matching audio notification tone, audio notification tone program 101 transmits a different audio tone over the teleconference or video conference. In another embodiment, if audio notification tone program 101 detects an outbound matching audio notification tone, audio notification tone program 101 removes the matching audio notification tone from being transmitted over the teleconference or video conference.

In an example, user A is participating on a teleconference on user A's laptop with users B and C as participants. In this example, a commonly used default audio notification tone is played from user A's smartphone, which is in close proximity to and is detected by user A's laptop. When the default audio notification tone is played over the teleconference, all of the participants check their phones for the notification even though the notification was for user A. Here, audio notification tone program 101 removes or modifies the audio notification tone from being transmitted over the teleconference if user B or user C also have a device or application that generates the same audio notification tone as the audio notification tone generated by user A's smartphone to avoid confusion as to the intended recipient of the notification tone.

In another example, user A is participating on a video conference on user A's laptop with users B and C as participants. In this example, user A is running a plurality of applications, including a messaging application, on user A's laptop while participating in the video conference. During the video conference, user A receives an audio notification from the messaging application running on user A's laptop. When an audio notification tone generated by user A's messaging application is transmitted over the video conference, user B checks her messaging application only to find out she does not have any new messages. User B has so many different messaging channels and domains that user B became distracted looking for the notification during the video conference. Since this keeps happening, user B decides to install audio notification tone program 101 on her user device. Accordingly, audio notification tone program 101 learns the sound profiles of notifications for user B's devices and applications. When incoming audio transmitted over future video conferences matches a learned sound profile of user B, audio notification tone program 101 modifies or blocks the audio to prevent user B from hearing notifications tones from other participants in the video conference that match any notification tones used by user B, thereby presenting user B from getting distracted and wasting time checking for a notification on her device(s) that was actually intended for someone else on the call.

Figure 2:
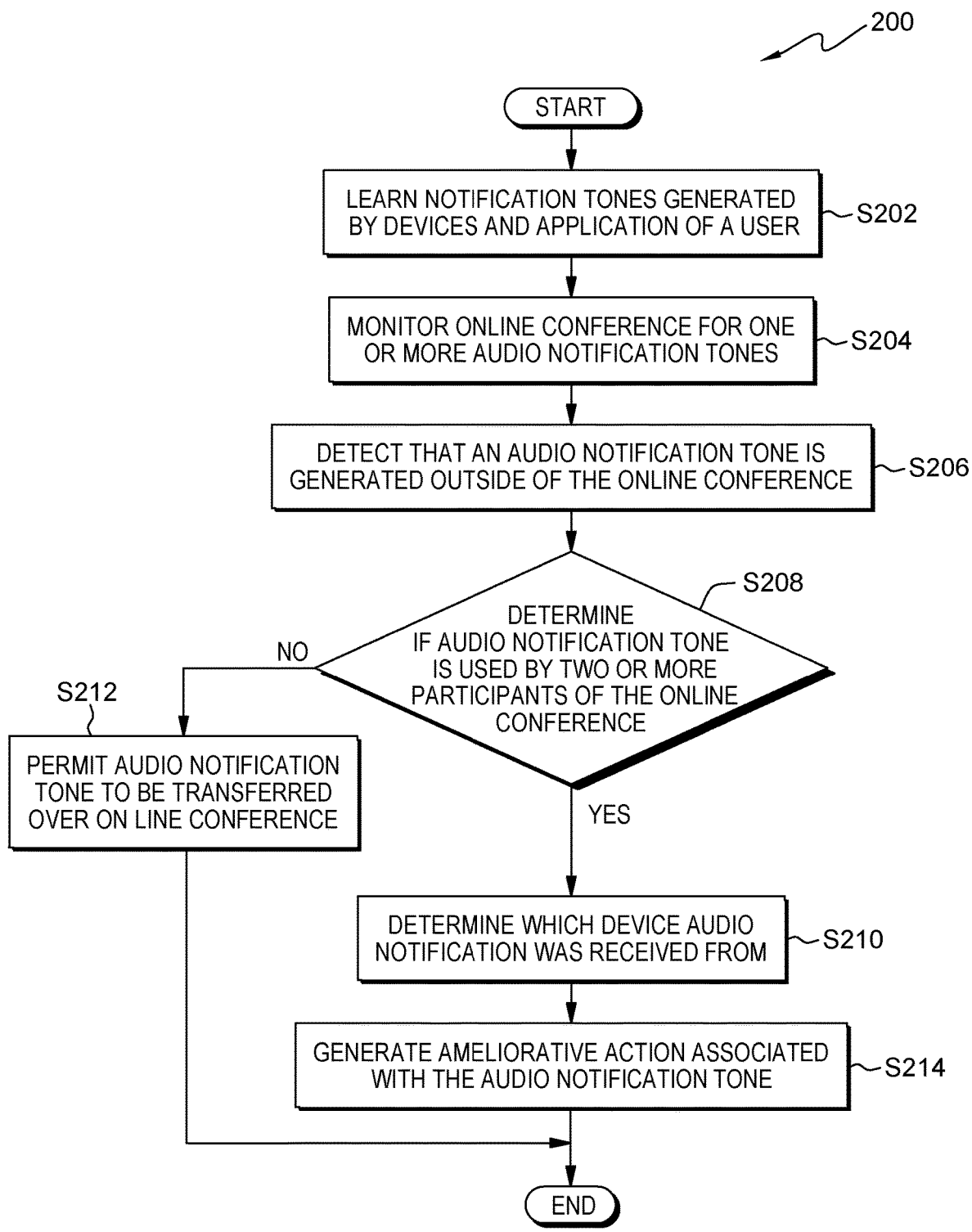
FIG. 2 is a flow chart diagram depicting operational steps for generating ameliorative actions for audio notification tones transmitted over an online conference, generally designated 200, in accordance with at least one embodiment of the present invention.

FIG. 2 is a flow chart diagram depicting operational steps for generating ameliorative actions for audio notification tones transmitted over an online conference, generally designated 200, in accordance with at least one embodiment of the present invention. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

At step S202, audio notification tone program 101 learns notification tones generated by devices and applications of a user. In an embodiment, audio notification tone program 101 learns notification tones generated by applications and devices associated with different users.

At step S204, audio notification tone program 101 monitors an online conference for one or more audio notification tones. In an embodiment, monitoring the online conference for one or more audio notification tones includes capturing an audio stream of audio transmitted by one or more devices at the server level or at the user device level. In an embodiment, audio notification tone program 101 transforms audio notification tones into audio or sound waves in order to compare an audio notification tone transmitted by a device during the online conference to audio tones associated with an audio notification user profile.

At step S206, audio notification tone program 101 detects that an audio notification tone is generated outside of the online conference. In an embodiment, an audio notification generated outside of the online conference is an audio notification not generated from an online conference application. For example, if an online conference is conducted via a web application, an audio notification generated outside of the online conference is a notification tone that is not generated via the web application itself. Rather, an audio notification generated outside of the online conference may be a notification generated from another application or device outside of the web application that is received and transmitted via the web application. In another example, if an online conference is conducted via application software, an audio notification generated outside of the online conference is a notification tone that is not generated via the application software itself. Rather, an audio notification generated outside of the online conference may be a notification generated from another application or device outside of the application software that is received and transmitted via the application software.

At decision step S208, audio notification tone program 101 determines if a detected audio notification tone is used by an application and/or device of two or more participants of the online conference. In an embodiment, audio notification tone program 101 compares the audio notification tone generated outside of the online conference with the previously learned audio notification tones associated with different users of the online conference. In an embodiment, audio notification tone program 101 compares the detected audio notification tone generated outside of the online conference with audio notification tones in audio notification tone user profile 132. In an embodiment, audio notification tone program 101 compares the detected audio notification tone generated outside of the online conference with standard audio notification tones 136. If it is determined that the detected audio notification tone is used by an application and/or device of two or more participants of the online conference (decision step S208 "YES" branch), audio notification tone program 101 proceeds to step S210. If it is determined that the audio notification tone is not used by an application and/or device of two or more participants of the online conference (decision step S208 "NO" branch), audio notification tone program 101 proceeds to step S212.

At step S210, audio notification tone program 101 determines which device the audio notification was received from. In an embodiment, determining which device the audio notification tone was received from includes determining the intended recipient of the audio notification.

At step S212, audio notification tone program 101 permits the audio notification tone to be communicated over the online conference. For example, if the audio notification tone is only used by an application and/or device of a single participant of the online conference, other participants of the conference will not be confused or mistakenly think that the audio notification is intended for them.

At step S214, audio notification tone program 101 generates an ameliorative action associated with the audio notification tone. In an embodiment, an ameliorative action includes one or more of modifying, scrubbing, and muting the detected audio notification tone used by an application and/or device of two or more participants of the online conference.

FIG. 3 is a block diagram depicting components of a computing device, generally designated 300, suitable for audio notification tone program 101 in accordance with at least one embodiment of the invention. Computing device 300 includes one or more processor(s) 304 (including one or more computer processors), communications fabric 302, memory 306 including, RAM 316 and cache 318, persistent storage 308, which further includes audio notification tone program 101, communications unit 312, I/O interface(s) 314, display 322, and external device(s) 320. It should be appreciated that FIG. 3 provides only an illustration of one embodiment and does not imply any limitations with regard to the environments in which different embodiments may be implemented. Many modifications to the depicted environment may be made.

As depicted, computing device 300 operates over communications fabric 302, which provides communications between computer processor(s) 304, memory 306, persistent storage 308, communications unit 312, and input/output (I/O) interface(s) 314. Communications fabric 302 can be implemented with any architecture suitable for passing data or control information between processor(s) 304 (e.g., microprocessors, communications processors, and network processors), memory 306, external device(s) 320, and any other hardware components within a system. For example, communications fabric 302 can be implemented with one or more buses.

Memory 306 and persistent storage 308 are computer readable storage media. In the depicted embodiment, memory 306 includes random-access memory (RAM) 316 and cache 318. In general, memory 306 can include any suitable volatile or non-volatile one or more computer readable storage media.

Program instructions for audio notification tone program 101 can be stored in persistent storage 308, or more generally, any computer readable storage media, for execution by one or more of the respective computer processor(s) 304 via one or more memories of memory 306. Persistent storage 308 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 312, in these examples, provides for communications with other data processing systems or devices. In these examples, communications unit 312 can include one or more network interface cards. Communications unit 312 may provide communications through the use of either or both physical and wireless communications links. In the context of some embodiments of the present invention, the source of the various input data may be physically remote to computing device 300 such that the input data may be received, and the output similarly transmitted via communications unit 312.

I/O interface(s) 314 allows for input and output of data with other devices that may operate in conjunction with computing device 300. For example, I/O interface(s) 314 may provide a connection to external device(s) 320, which may be as a keyboard, keypad, a touch screen, or other suitable input devices. External device(s) 320 can also include portable computer readable storage media, for example thumb drives, portable optical or magnetic disks, and memory cards. Software and data used to practice embodiments of the present invention can be stored on such portable computer readable storage media and may be loaded onto persistent storage 308 via I/O interface(s) 314. I/O interface(s) 314 also can similarly connect to display 322. Display 322 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

FIG. 4 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
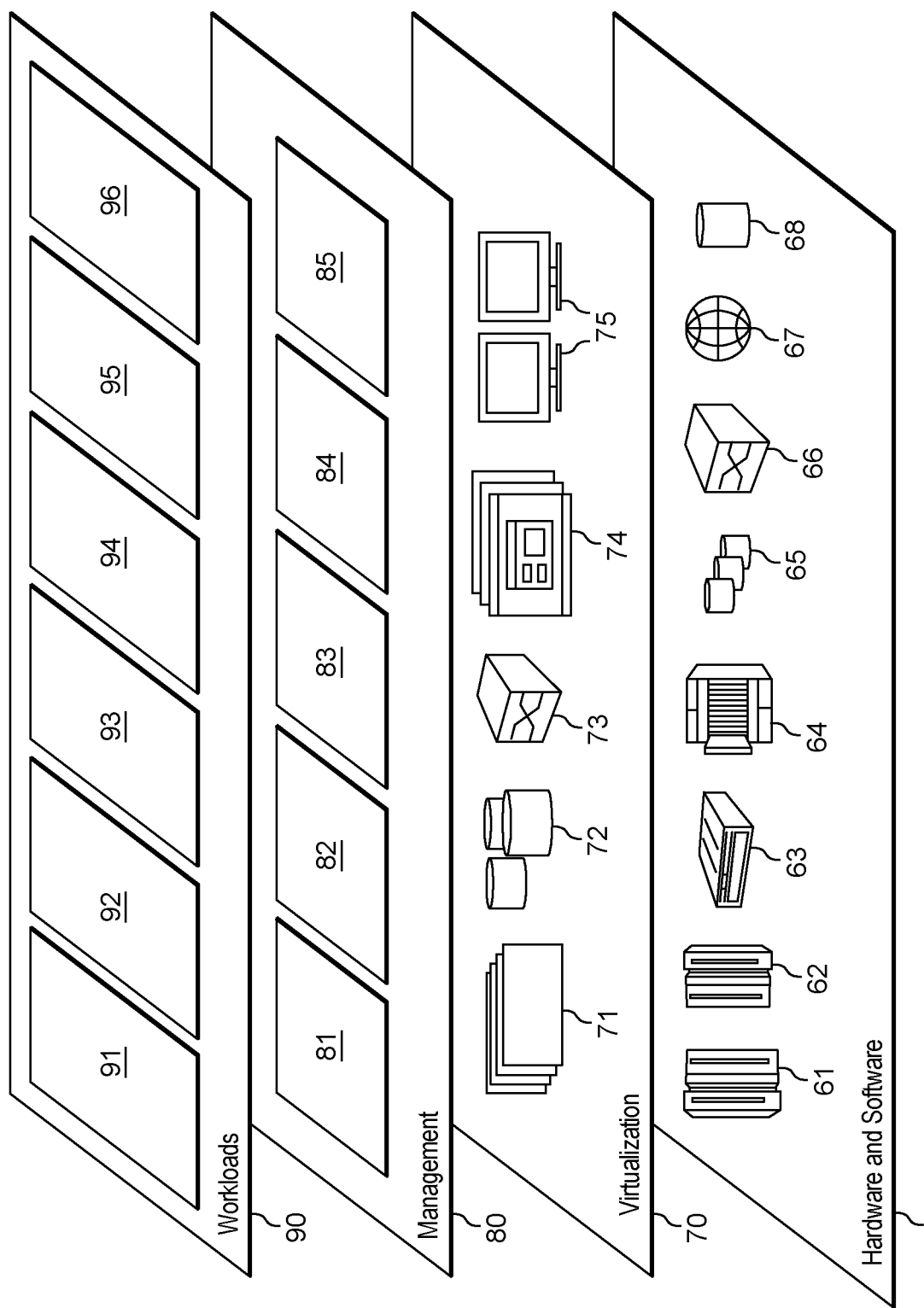
FIG. 5 is block diagram depicting a set of functional abstraction model layers provided by cloud computing environment 50 depicted in FIG. 4 in accordance with at least one embodiment of the present invention.

FIG. 5 is block diagram depicting a set of functional abstraction model layers provided by cloud computing environment 50 depicted in FIG. 3 in accordance with at least one embodiment of the present invention. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and notification tone modification 96.

What is claimed is:

1. A computer-implemented method for real-time modification of notification tones to distinguish an intended recipient of a notification tone, comprising:

monitoring an audio stream of an online conference for one or more notification tones;

detecting that a first notification tone generated outside of the online conference matches a notification tone of at least one of an application or a user device associated with two or more participants of the online conference; and responsive to detecting that the first notification tone matches the notification tone of the at least one of the application or the user device associated with two or more participants of the online conference:

generating an ameliorative action associated with the first notification tone.

2. The computer-implemented method of claim 1, further comprising:

learning, for a plurality of users, the particular notification tones generated by applications and user devices associated with each user in the plurality of users.

3. The computer-implemented method of claim 1, wherein generating an ameliorative action associated with the first notification tone further comprises:

determining a user device that is transmitting the first notification tone;

modifying the first notification tone being transmitted from the user device; and transmitting the modified notification tone via the online conference, wherein the modified notification tone is different than any notification tones generated by applications or user devices associated with participants of the online conference.

4. The computer-implemented method of claim 1, wherein detecting that a first notification tone generated outside of the online conference matches the notification tone of an at least one of the application or the user device of two or more participants of the online conference further comprises:

transforming the first notification tone into an audio waveform; and comparing the audio waveform to one or more audio waveforms corresponding to known notification tones generated by applications and devices associated with participants of the online conference.

5. The computer-implemented method of claim 1, wherein generating an ameliorative action associated with the first notification tone further comprises:

preventing the first notification tone from being transmitted via the online conference.

6. The computer-implemented method of claim 1, further comprising:

alerting a participant via the online conference that the first notification tone is intended for another participant.

7. The computer-implemented method of claim 1, wherein generating an ameliorative action associated with the first notification tone further comprises:

automatically muting an audio input of a device transmitting the first notification tone to the online conference.

8. A computer program product for real-time modification of notification tones to distinguish an intended recipient of a notification tone, the computer program product comprising one or more computer readable storage media and program instructions stored on the one or more computer readable storage media, the program instructions including instructions to:

monitor an audio stream of an online conference for one or more notification tones;

detect that a first notification tone generated outside of the online conference matches a notification tone of at least one of an application or a user device associated with two or more participants of the online conference; and responsive to detecting that the first notification tone matches the notification tone of the at least one of the application or the user device associated with two or more participants of the online conference:

generate an ameliorative action associated with the first notification tone.

9. The computer program product of claim 8, further comprising instructions to:

learn, for a plurality of users, the particular notification tones generated by applications and user devices associated with each user in the plurality of users.

10. The computer program product of claim 8, wherein the instructions to generate an ameliorative action associated with the first notification tone further comprises:

determine a user device that is transmitting the first notification tone;

modify the first notification tone being transmitted from the user device; and transmit the modified notification tone via the online conference, wherein the modified notification tone is different than any notification tones generated by applications or user devices associated with participants of the online conference.

11. The computer program product of claim 8, wherein detecting that a first notification tone generated outside of the online conference matches the notification tone of an at least one of the application or the user device of two or more participants of the online conference further comprises:

transform the first notification tone into an audio waveform; and compare the audio waveform to one or more audio waveforms corresponding to known notification tones generated by applications and devices associated with participants of the online conference.

12. The computer program product of claim 8, wherein generating an ameliorative action associated with the first notification tone further comprises:

prevent the first notification tone from being transmitted via the online conference.

13. The computer program product of claim 8, further comprising instructions to:

alert a participant via the online conference that the first notification tone is intended for another participant.

14. The computer program product of claim 8, wherein the instructions to generate an ameliorative action associated with the first notification tone further comprises:

automatically mute an audio input of a device transmitting the first notification tone to the online conference.

15. A computer system for real-time modification of notification tones to distinguish an intended recipient of a notification tone, comprising:

one or more computer processors;

one or more computer readable storage media; and computer program instructions, the computer program instructions being stored on the one or more computer readable storage media for execution by the one or more computer processors, the computer program instructions including instructions to:

monitor an audio stream of an online conference for one or more notification tones;

detect that a first notification tone generated outside of the online conference matches a notification tone of at least one of an application or a user device associated with two or more participants of the online conference; and responsive to detecting that the first notification tone matches the notification tone of the at least one of the application or the user device associated with two or more participants of the online conference:

generate an ameliorative action associated with the first notification tone.

16. The computer system of claim 15, further comprising instructions to:

learn, for a plurality of users, the particular notification tones generated by applications and user devices associated with each user in the plurality of users.

17. The computer system of claim 15, wherein the instructions to generate an ameliorative action associated with the first notification tone further comprises:

determine a user device that is transmitting the first notification tone;

modify the first notification tone being transmitted from the user device; and transmit the modified notification tone via the online conference, wherein the modified notification tone is different than any notification tones generated by applications or user devices associated with participants of the online conference.

18. The computer system of claim 15, wherein detecting that a first notification tone generated outside of the online conference matches the notification tone of an at least one of the application or the user device of two or more participants of the online conference further comprises:

transform the first notification tone into an audio waveform; and compare the audio waveform to one or more audio waveforms corresponding to known notification tones generated by applications and devices associated with participants of the online conference.

19. The computer system of claim 15, wherein generating an ameliorative action associated with the first notification tone further comprises:

prevent the first notification tone from being transmitted via the online conference.

20. The computer system of claim 15, further comprising instructions to:

alert a participant via the online conference that the first notification tone is intended for another participant.

* * * * *